(12) United States Patent
Yoon et al.

(10) Patent No.: US 9,904,582 B2
(45) Date of Patent: Feb. 27, 2018

(54) METHOD AND APPARATUS FOR EXECUTING SOFTWARE IN ELECTRONIC DEVICE

(71) Applicant: Samsung Electronics Co., Ltd., Gyeonggi-do (KR)

(72) Inventors: Uison Yoon, Gyeonggi-do (KR); Rakie Kim, Gyeonggi-do (KR); Jijoong Moon, Seoul (KR); Cheolyong Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 14/821,640

(22) Filed: Aug. 7, 2015

(65) Prior Publication Data
US 2016/0041845 A1    Feb. 11, 2016

(30) Foreign Application Priority Data

Aug. 7, 2014 (KR) ......................... 10-2014-0101910

(51) Int. Cl.
*G06F 9/46* (2006.01)
*G06F 9/50* (2006.01)

(52) U.S. Cl.
CPC ............ *G06F 9/505* (2013.01); *G06F 9/5094* (2013.01); *Y02B 60/142* (2013.01)

(58) Field of Classification Search
CPC ........ G06F 1/324; G06F 1/329; G06F 1/3293; G06F 1/3296; G06F 1/26; G06F 2205/061
See application file for complete search history.

(56) References Cited

U.S. PATENT DOCUMENTS

| 5,623,647 | A | * | 4/1997 | Maitra .................... G06F 1/206 713/501 |
| 6,076,171 | A | * | 6/2000 | Kawata ..................... G06F 1/08 713/322 |
| 6,711,447 | B1 | * | 3/2004 | Saeed ................... G06F 1/3203 700/82 |
| 7,634,678 | B2 | * | 12/2009 | Winbom ............... G06F 1/3203 713/322 |
| 8,978,022 | B2 |  | 3/2015 | Kalogeropulos et al. |

(Continued)

OTHER PUBLICATIONS

International Search Report issued for PCT/KR2015/008302 dated Nov. 20, 2015, 3 pgs.

*Primary Examiner* — Hiren Patel

(57) ABSTRACT

An apparatus includes a calculation processing unit configured to perform a calculation in the electronic device, a device manager configured to controls a speed of the calculation processing unit and output load factor information, one or more user-level application programs with a respective load factor limit, configured to request for load factor limit information of the calculation processing unit and calculation of a load with a load factor limit, and a service quality manager configured to receive the load factor limit information and the load with the load factor limit from the user-level application programs with the load factor limit, receive load factor information of the calculation processing unit from the device manager, generate a calculation parameter so that a load factor of the calculation processing unit is within the load factor limit information, and output the load with the load factor limit and the generated calculation parameter.

15 Claims, 3 Drawing Sheets

(56) References Cited

U.S. PATENT DOCUMENTS

| | | | |
|---|---|---|---|
| 9,086,876 B2* | 7/2015 | Gustaffson | G06F 1/3203 |
| 9,176,569 B2* | 11/2015 | Chen | |
| 9,696,771 B2* | 7/2017 | Park | G06F 1/206 |
| 2001/0044909 A1* | 11/2001 | Oh | G06F 1/3203 |
| | | | 713/600 |
| 2003/0226047 A1* | 12/2003 | Park | G06F 1/3203 |
| | | | 713/300 |
| 2005/0034002 A1 | 2/2005 | Flautner | |
| 2006/0047987 A1* | 3/2006 | Prabhakaran | G06F 1/3203 |
| | | | 713/322 |
| 2008/0201589 A1* | 8/2008 | Turner | G06F 1/3203 |
| | | | 713/321 |
| 2009/0204830 A1* | 8/2009 | Frid | G06F 1/3203 |
| | | | 713/322 |
| 2009/0271646 A1* | 10/2009 | Talwar | G06F 1/3203 |
| | | | 713/322 |
| 2010/0169701 A1* | 7/2010 | Tu | G06F 1/3203 |
| | | | 713/600 |
| 2010/0251251 A1* | 9/2010 | Lee | G06F 9/5027 |
| | | | 718/103 |
| 2010/0287396 A1* | 11/2010 | Barth | G06F 1/3228 |
| | | | 713/323 |
| 2011/0078477 A1* | 3/2011 | Park | G06F 1/3203 |
| | | | 713/322 |
| 2012/0011377 A1* | 1/2012 | Yu | G06F 1/206 |
| | | | 713/300 |
| 2012/0054503 A1* | 3/2012 | Hsiao | G06F 1/3206 |
| | | | 713/300 |
| 2012/0060170 A1* | 3/2012 | Vajda | G06F 9/4893 |
| | | | 718/104 |
| 2012/0072746 A1* | 3/2012 | Sotomayor | G06F 1/324 |
| | | | 713/320 |
| 2013/0007493 A1* | 1/2013 | Murakami | G06F 1/324 |
| | | | 713/322 |
| 2013/0031353 A1* | 1/2013 | Noro | G06F 1/3212 |
| | | | 713/100 |
| 2013/0080809 A1* | 3/2013 | Lu | G06F 1/206 |
| | | | 713/322 |
| 2013/0191658 A1 | 7/2013 | Malik et al. | |
| 2013/0191845 A1* | 7/2013 | Koumori | G06F 9/5083 |
| | | | 718/105 |
| 2013/0205149 A1* | 8/2013 | Chen | G06F 1/3225 |
| | | | 713/322 |
| 2013/0290751 A1* | 10/2013 | Mondal | G06F 1/3206 |
| | | | 713/320 |
| 2014/0068285 A1* | 3/2014 | Lee | G06F 1/324 |
| | | | 713/300 |
| 2014/0075224 A1* | 3/2014 | Lee | G06F 1/324 |
| | | | 713/322 |
| 2014/0086053 A1* | 3/2014 | Noro | H04W 28/0231 |
| | | | 370/235 |
| 2014/0089699 A1* | 3/2014 | O'Connor | G06F 1/324 |
| | | | 713/322 |
| 2014/0095909 A1* | 4/2014 | Turullols | G06F 1/10 |
| | | | 713/322 |
| 2014/0115366 A1 | 4/2014 | Joo et al. | |
| 2014/0173311 A1* | 6/2014 | Park | G06F 1/206 |
| | | | 713/320 |
| 2014/0181544 A1 | 6/2014 | Breen et al. | |
| 2014/0195788 A1 | 7/2014 | Kalogeropulos et al. | |
| 2014/0195843 A1 | 7/2014 | Lai et al. | |
| 2014/0223219 A1* | 8/2014 | Aelion | G06F 1/3206 |
| | | | 713/400 |
| 2014/0281613 A1* | 9/2014 | Kaito | G06F 1/324 |
| | | | 713/322 |
| 2014/0365808 A1* | 12/2014 | Deshmukh | G06F 1/12 |
| | | | 713/375 |
| 2015/0082076 A1* | 3/2015 | Jagmag | G06F 1/04 |
| | | | 713/600 |
| 2015/0309552 A1* | 10/2015 | Vanka | G06F 1/324 |
| | | | 713/322 |
| 2016/0116954 A1* | 4/2016 | Zhuang | G06F 1/26 |
| | | | 713/300 |

* cited by examiner

METHOD AND APPARATUS FOR EXECUTING SOFTWARE IN ELECTRONIC DEVICE

CROSS-REFERENCE TO RELATED APPLICATION AND CLAIM OF PRIORITY

The present application is related to and claims benefit under 35 U.S.C. § 119(a) of Korean Patent Application No. 10-2014-0101910, filed on Aug. 7, 2014, which is hereby incorporated by reference for all purposes as if fully set forth herein.

TECHNICAL FIELD

The present disclosure relates generally to a method and apparatus for executing software in an electronic device, and more particularly, to a method and apparatus for executing software, which are suitable for a state of an electronic device and characteristics of the software.

BACKGROUND

Most electronic devices which are currently used have OSs (Operating Systems) provided by developers or a general-purpose OS, and have been developed in the form for providing the maximum efficiency. These OSs provide only a system-level device control method. For example, the general-purpose OS or the OS provided by the developer may control the execution of the software of all users, and provide the related information to a device controller, so that device control in consideration of the overall situation of the system is possible. Such a device control method has been developed to enable all the user-level software to take full advantage of an execution device. In other words, the device control method may control all CPU cores to be raised up to the maximum operating frequency and executed.

When the operating frequency becomes higher in order to drive specific software in the electronic device in this manner, the power consumption is increased, whereby heat generation and energy leakage may occur. This may cause an increase in a leakage current, and the heat generation consequently acts as a factor to consume a larger amount of energy in the electronic device. In particular, in a case of mobile electronic devices which have been recently and widely used, the energy efficiency may be a greater problem and acts as an important performance indicator.

Meanwhile, in the case of the specific software of the electronic device, a case in which the specific software may not need to be driven at the maximum value of the ability of the electronic device may often occur. However, even in this case, the OS of the electronic device has been designed to be driven with the maximum performance or the performance in close proximity thereto regardless of the characteristics of the software, as described above. When the software is driven with the maximum performance or the performance in close proximity thereto in this manner, the current consumption may be increased due to the heat generation or the like.

SUMMARY

To address the above-discussed deficiencies, it is a primary object to provide a method and apparatus for driving software in an electronic device while limiting the performance of the electronic device according to characteristics of the software.

Also, the present disclosure provides a method and apparatus for driving software, which may reduce the current consumption of an electronic device.

Also, the present disclosure provides a method and apparatus for driving software, which may reduce the heat generation of an electronic device.

Also, the present disclosure provides a method and apparatus for driving software according to the state of an electronic device.

In accordance with an aspect of the present disclosure, an apparatus for executing software in an electronic device is provided. The apparatus includes a calculation processing unit that performs calculation performed in the electronic device a device manager that controls a calculation processing speed of the calculation processing unit and outputs load factor information, one or more user-level application programs with a load factor limit that request load factor limit information of the calculation processing unit and calculation of a load with a load factor limit, and a service quality manager that receives the load factor limit information and the load with the load factor limit from the user-level application programs with the load factor limit, receives load factor information of the calculation processing unit from the device manager, generates a calculation parameter so that a load factor of the calculation processing unit is within the load factor limit information, and outputs the load with the load factor limit and the generated calculation parameter.

In accordance with another aspect of the present disclosure, a method for executing software in an electronic device in a method for calculating a load in an electronic device having a user-level application program with a load factor limit, which can output a load with a load factor limit, is provided. The method for executing software includes receiving load factor limit information and the load with the load factor limit from the user-level application program with the load factor limit; receiving load factor information of a calculation processing unit, generating a calculation parameter so that the load factor information of the calculation processing unit is within the load factor limit information, and outputting the load with the load factor limit and the generated calculation parameter.

When adopting the method and apparatus according to an embodiment of the present disclosure, it is possible to drive user software according to the state of the electronic device, thereby reducing heat generation and current consumption. In addition, it is possible to prevent power consumption and heat generation which are unintended by the user software.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will be more apparent from the following detailed description in conjunction with the accompanying drawings, in which: For a more complete understanding of the present disclosure and its advantages, reference is now made to the following description taken in conjunction with the accompanying drawings, in which like reference numerals represent like parts.

DETAILED DESCRIPTION

Figure 1:
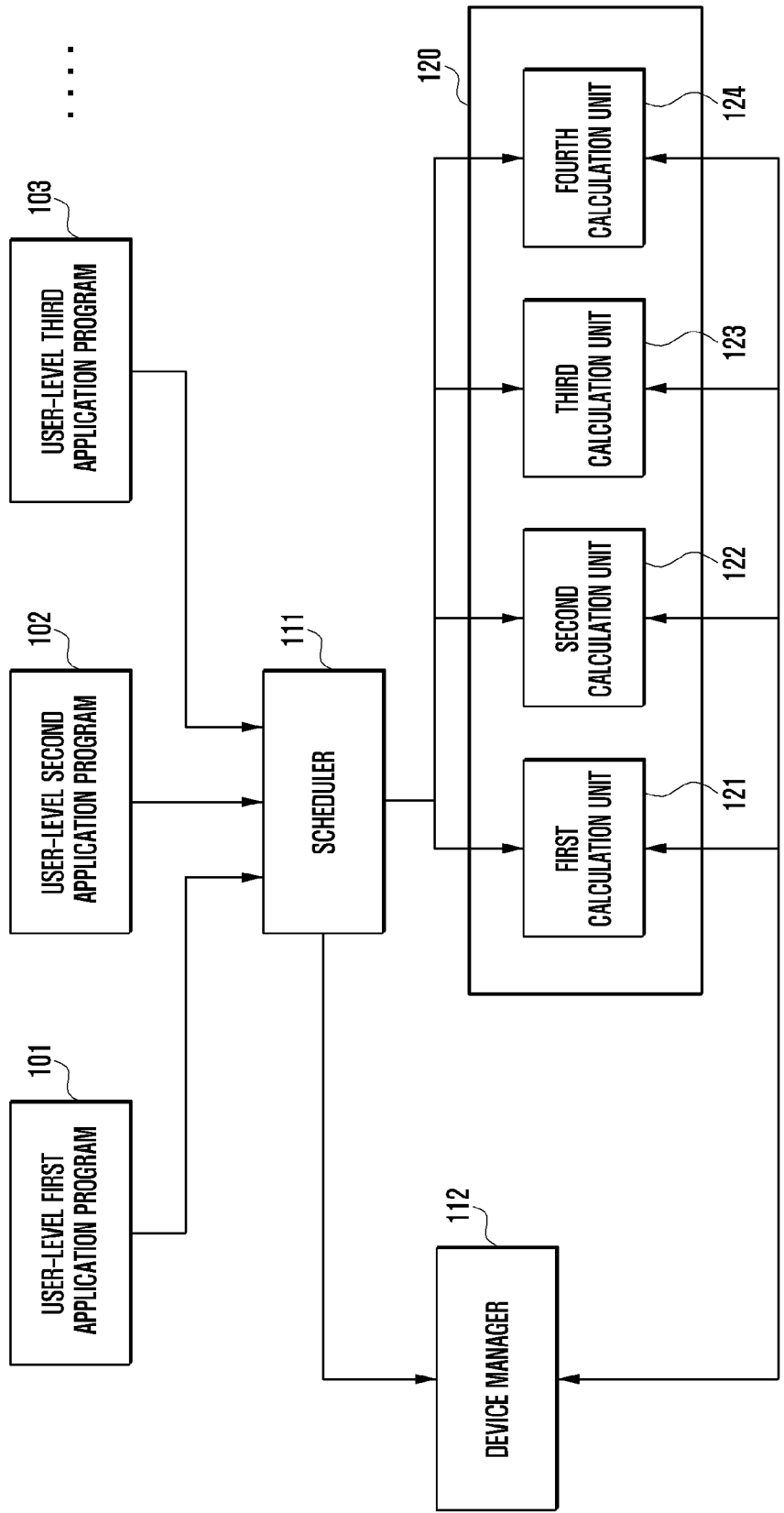
FIG. 1 is a conceptual diagram illustrating the driving of a user-level application program in an electronic device.
Figure 2:
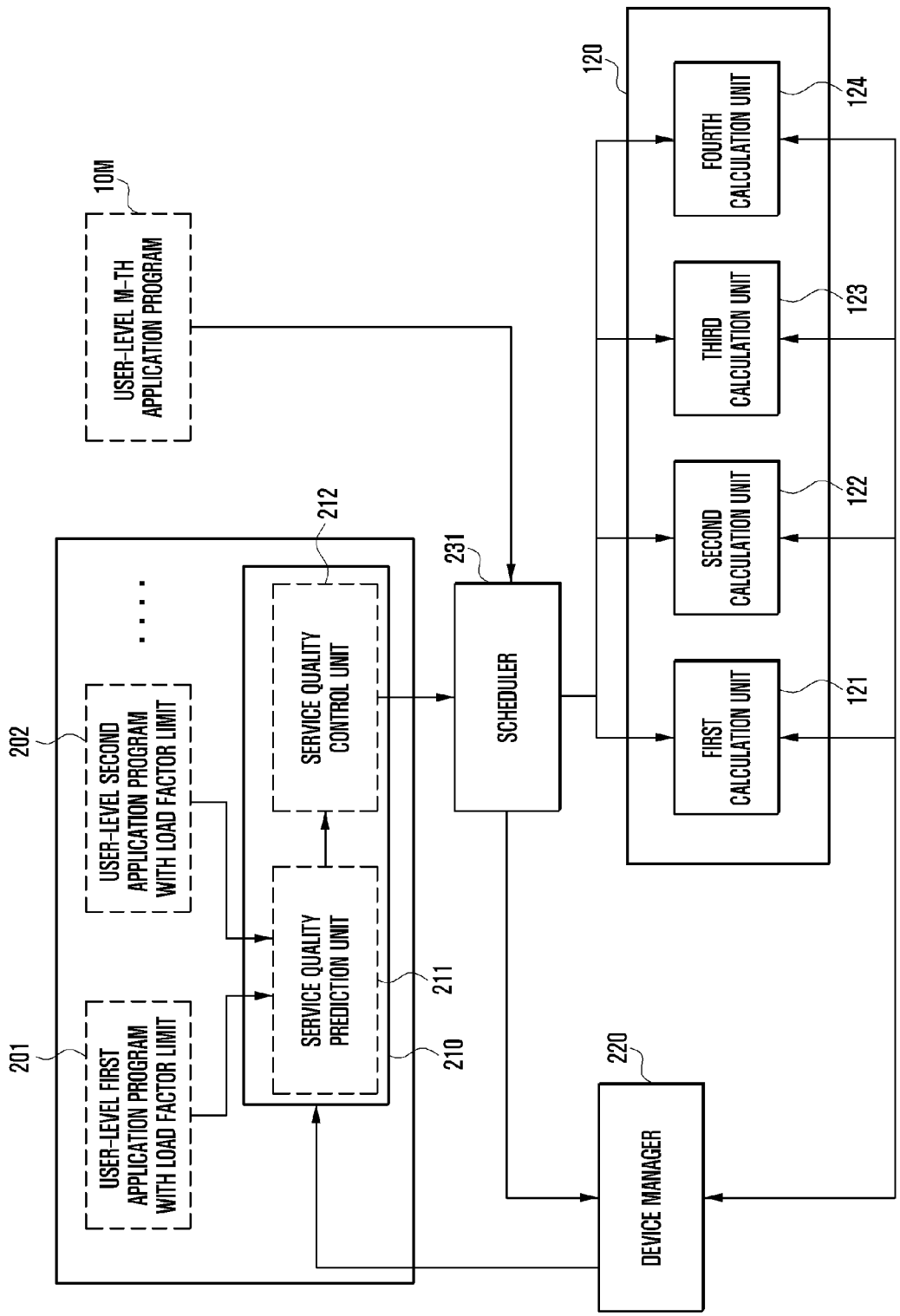
FIG. 2 is a conceptual diagram illustrating the driving of a user-level application program in an electronic device according to an embodiment of the present disclosure.
Figure 3:
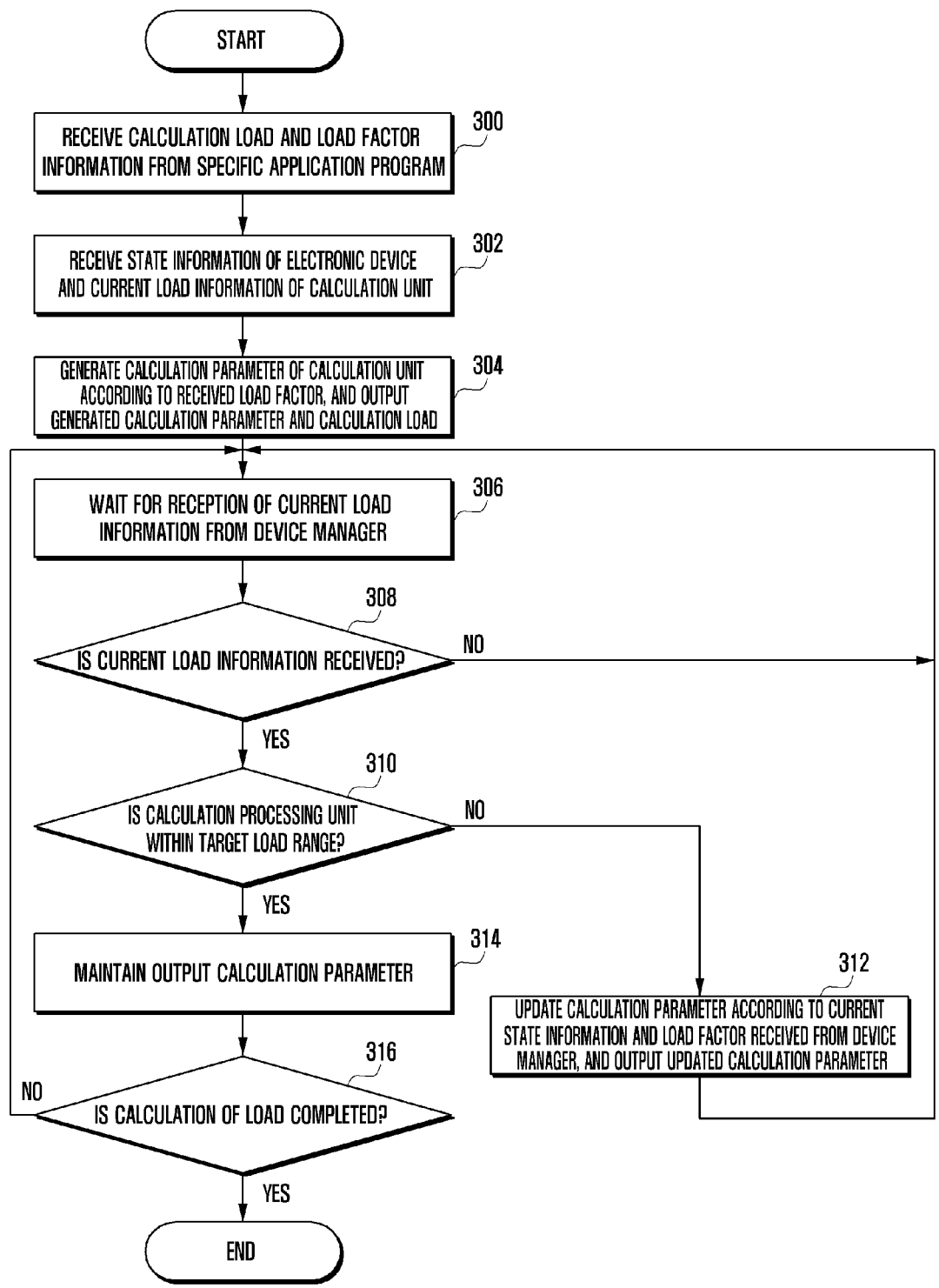
FIG. 3 is a control flowchart when driving a user-level application program in an electronic device according to an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described in detail with reference to the accompanying drawings. It should be noted that the same elements will be designated by the same reference numerals although they are shown in different drawings. The accompanying drawings of the present disclosure are provided in order to help understanding of the present disclosure, and it should be noted that the present disclosure is not limited to a form, disposition and the like which are exemplified in the accompanying drawings of the present disclosure. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

FIG. 1 is a conceptual diagram illustrating the driving of a user-level application program in an electronic device.

User-level application programs 101, 102, 103, . . . can be various types of application programs driven in an electronic device. By way of an example, when the electronic device is a mobile terminal such as a cellular phone or a smartphone, various types of application programs that can be driven in a user-level, such as a dialing application, a text sending/receiving application, a game application, a scheduling application, a messenger application, and the like, can be the user-level application programs. In FIG. 1, the types of the application programs that are not limited to specific applications, such as a user-level first application program 101, a user-level second application program 102, a user-level third application program 103, and the like, are illustrated.

When the driving of each of these applications is requested, a load of which calculation is required is output to a scheduler 111. Here, the request for the driving of the application can be made by a user or made in a case in which a time when the driving is requested has arrived. In addition, the load of which calculation is required (hereinafter, referred to as "calculation load") can be a calculation load so as to enable a specific user-level application program to be operated. By way of an example, in the case of a game, when the driving of a game application is requested, data for the driving of the game should be read from a memory (not shown in FIG. 1), and various calculations for the loading and execution of the game are needed.

When receiving the load from a predetermined user-level application program, the scheduler 111 can output the received load to the corresponding calculation unit, so that the load is evenly distributed to calculation units 121, 122, 123, and 124 provided within a calculation processing unit 120. By way of an example, it is assumed that the load state of the first calculation unit 121 is 20%, the load state of the second calculation unit 122 is 85%, the load state of the third calculation unit 123 is 80%, and the load state of the fourth calculation unit 124 is 83%. In this case, since the load of the first calculation unit 121 of the calculation processing unit 120 is the lowest, the scheduler 111 can output the load received from the specific user-level application program to the first calculation unit 121, so that the corresponding calculation is performed.

By way of another example, it is assumed that the load state of the first calculation unit 121 is 90%, the load state of the second calculation unit 122 is 17%, the load state of the third calculation unit 123 is 88%, and the load state of the fourth calculation unit 124 is 74%. In this case, since the load of the second calculation unit 122 of the calculation processing unit 120 is the lowest, the scheduler 111 can output a load received from a specific user-level application program to the second calculation unit 122, so that the corresponding calculation is performed.

In this manner, the scheduler 111 serves to prevent the load received from the individual application programs from concentrating on the specific calculation unit within the calculation processing unit 120. In addition, the scheduler 111 can provide, to a device manager 112, information about an amount of load, namely, information about the total amount of load that should be processed in the calculation unit and an amount of load that should be calculated for a unit time, while providing the calculation load to the specific calculation unit. For example, when a specific load is required to calculate information of 1 Mbyte for a unit time of 0.5 ms, the scheduler 111 can provide this information to the device manager 112.

The calculation processing unit 120 can have only a single calculation unit, but in recent years, the majority of electronic devices have been manufactured in the form having a plurality of calculation units in order to increase the processing speed. For example, the number of electronic devices including two or more calculation units such as a dual-core, a quad-core, or the like has been increased, and in FIG. 1, a case in which an electronic device includes two or more calculation units in this manner is illustrated. The individual calculation units 121, 122, 123, and 124 illustrated in FIG. 1 can be calculation processing devices having the same calculation processing capacity.

The device manager 112 can control the calculation speed of each of the calculation units 121, 122, 123, and 124. For example, each of the calculation units 121, 122, 123, and 124 can have three states such as a dormant state in which no action is taken, an idle state in which only a basic operation is performed, and a calculation state in which a load is received from a specific application program so that the corresponding calculation is performed. In addition, the calculation state can be further classified into a case in which high-speed calculation is required and a case in which low-speed calculation is required, as described above. For example, as to each of the calculation units 121, 122, 123, and 124, there are cases in which an amount of calculation that should be processed for a predetermined unit time, for example, 1 second is 1 Mbyte and 20 Mbyte. In this manner, the load factor of each of the calculation units 121, 122, 123, and 124 can be determined depending on an amount of calculation that should be processed per unit time. Thus, the device manager 112 can control each of the calculation units 121, 122, 123, and 124 so that the processing speed can vary depending on the load factor of each of the calculation units 121, 122, 123, and 124 provided from the scheduler 111.

Most electronic devices have the configuration described in FIG. 1. When the electronic device has the configuration of FIG. 1, there is no big problem in a case in which the electronic device is in a normal operating state other than a sleep state. However, as to a specific user-level application program, there are cases in which calculation is required in the sleep state. For example, there are cases in which the electronic device provides an alarm according to scheduling, in which a user requests that an operation is performed in a specific time zone, and the like.

In the case of the operation desired to be performed in the specific time zone in this manner or in a sleep time zone of the electronic device, the corresponding calculation is performed in any one among the calculation units of the calculation processing unit 120. In a case of a sleep time of the electronic device or a case in which a time zone set by a user is the sleep time zone of the electronic device, in most cases, calculation at a maximum calculation speed that can be processed by the calculation unit or calculation at a speed equivalent to the maximum calculation speed is not required. However, all application programs and schedulers 111 which are provided up to now cannot control the corresponding calculation to be performed depending on the state of the electronic device.

Accordingly, the calculation units can perform the corresponding calculation at the maximum calculation speed or the speed equivalent to the maximum calculation speed, whereby a problem such as heat generation or power consumption of the electronic device can occur. Thus, in order to address this problem, the configuration and operation according to the present disclosure will be described with reference to the accompanying drawings.

FIG. 2 is a conceptual diagram illustrating the driving of a user-level application program in an electronic device according to an embodiment of the present disclosure.

Prior to the description with reference to FIG. 2, it should be noted that the same configurations as those shown in FIG. 1 are denoted by the same reference numerals. In addition, in a case in which components even having the same name among the components of FIG. 2 perform an additional operation or there is a change in an operation, they are denoted by different reference numerals.

Referring to FIG. 2, user-level application programs can be first classified into two types. The user-level application programs can be classified into user-level application programs 201, 202, . . . with a load factor limit, which can provide a load with a load factor limit of the calculation processing unit 120, and user-level application programs 10M, . . . without a load factor limit of the same type as that in FIG. 1.

For example, the user-level first application program 201 with the load factor limit requires the calculation of a load with the load factor limit and the calculation of a load without the load factor limit. Here, the load with the load factor limit refers to a load that is set in such a manner that a load calculated in the calculation processing unit 120 or at least one of the calculation units 121, 122, 123, and 124 within the calculation processing unit 120 is managed to have a preset load factor or less. For example, the load with the load factor limit is a load that is set in such a manner that calculation processing is performed by a preset load factor of the calculation unit or less such as 20% or 30%, when calculation is performed in one or more calculation units. In addition, the load without the load factor limit refers to a load that is calculated generally in the calculation unit.

Accordingly, the user-level application programs according to the present disclosure can be classified into two types. That is, the user-level application programs according to the present disclosure can be classified into user-level application programs that can request the calculation of a load with a load factor limit and user-level application programs that can request only the calculation of a load without a load factor limit. In FIG. 2, the application programs such as the user-level first application program 201 with the load factor limit, the user-level second application program 202 with the load factor limit, . . . can be the application programs that can request the calculation of the load with the load factor limit. In addition, in FIG. 2, the user-level M-th application program 10M, . . . refers to a general load that has been described in FIG. 1.

In the user-level application programs with the load factor limit according to the present disclosure, load factor limit values can be values set in advance when the corresponding application programs are designed. In addition, when the user-level application programs with the load factor limit according to the present disclosure do not provide the load factor limit values, a load factor limit value set in advance by the electronic device itself can be used.

The load factor limit value can be applied differently depending on the state of the electronic device. For example, when the electronic device is in a sleep state (minimum power maintenance state), the load factor is adjusted to be maintained at, for example, 10% or less, when the electronic device is in an idle state, the load factor is adjusted to be maintained at 30% or less, and when the electronic device is in an active state, the load factor is adjusted to be maintained at 50% or less.

The user-level application programs with the load factor limit according to the present disclosure can provide the load factor limit value and the load with the load factor limit to a service quality manager 210. The service quality manager 210 can be constituted of a service quality prediction unit 211 and a service quality control unit 212.

The service quality prediction unit 211 can receive load factor limit information and the load with the load factor limit from each of the user-level application programs with the load factor limit 201, 202, . . . . In this instance, when the load factor limit information is not provided or set not to be provided, the service quality prediction unit 211 can discern the state of the electronic device, and determine a limited load factor according to the discerned state. When receiving the limited load factor and a load to be calculated by the limited load factor in this manner, the service quality prediction unit 211 can compute and output a calculation parameter for calculating the corresponding load by the limited load factor.

The service quality prediction unit 211 can receive load factor information of each of the calculation units 121, 122, 123, and 124 within the calculation processing unit 120 from the device manager 220, and inspect whether the corresponding load is calculated by a target load factor or less. When the corresponding load is calculated by the target load factor or less, the service quality prediction unit 211 can maintain a computed calculation parameter value. On the other hand, when the corresponding load is calculated by a load factor higher than the target load factor by a threshold value or larger or a load factor lower than the target load factor by less than the threshold value, the service quality prediction unit 211 can update and output the calculation parameter value. Thus, the load factor of the calculation processing unit 120 can be adjusted.

The service quality control unit 212 provides, to a scheduler 231, the calculation parameter value generated from the service quality prediction unit 211 and the corresponding load in which a load factor limit is required. When the calculation processing unit 120 is constituted of a single calculation unit, the scheduler 231 may not be required. Thus, when the scheduler 231 is absent, the service quality control unit 212 can provide the calculation parameter value and the load in which the load factor limit is required, directly to the calculation processing unit 120. Here, the calculation parameter value can be different from that provided through the scheduler 231.

The user-level application programs 10M, . . . can be various types of application programs driven in the electronic device, and can output a load of which calculation is required to the scheduler 231, when the load of which calculation is required is generated in the calculation processing unit 120. When the driving of each of these applications is requested, the load of which calculation is required is output to the scheduler 231. Here, the request for the driving of the application can be made by a user or made in a case in which a time when the driving is requested by the electronic device itself has arrived. In addition, the load of which calculation is required (hereinafter, referred to as "calculation load") can be a calculation load so as to enable a specific user-level application program to be operated. By way of an example, in the case of a game, when the driving of a game application is requested, data for the driving of the game should be read from a memory (not shown in FIG. 2), and various calculations for the loading and execution of the game are needed.

When receiving the load from a predetermined user-level application program, the scheduler 231 can output the received load to the corresponding calculation unit, so that the load is evenly distributed to the calculation units 121, 122, 123, and 124 provided within the calculation processing unit 120. By way of an example, it is assumed that the load state of the first calculation unit 121 is 20%, the load state of the second calculation unit 122 is 85%, the load state of the third calculation unit 123 is 80%, and the load state of the fourth calculation unit 124 is 83%. In this case, since the load of the first calculation unit 121 of the calculation processing unit 120 is the lowest, the scheduler 231 can output the load received from the specific user-level application program to the first calculation unit 121, so that the corresponding calculation is performed.

In this instance, when receiving the calculation parameter and the load from the service quality control unit 212, the scheduler 231 can generate control information to distribute the load, so that the corresponding load can be calculated by a specific load factor in the calculation unit that performs the calculation of the corresponding load among the calculation units 121, 122, 123, and 124 within the calculation processing unit 120 based on the calculation parameter. In addition, the scheduler 231 can provide information based on the distributed load to the device manager 220.

The calculation processing unit 120 can have only a single calculation unit as described above, but in recent years, the majority of electronic devices have been manufactured in the form having a plurality of calculation units in order to increase the processing speed. For example, the number of electronic devices including two or more calculation units such as a dual-core, a quad-core, or the like has been increased, and in FIG. 1, a case in which an electronic device includes two or more calculation units in this manner is illustrated. The individual calculation units 121, 122, 123, and 124 illustrated in FIG. 2 can be calculation processing devices having the same calculation processing capacity.

The device manager 220 can control the calculation speed of each of the calculation units 121, 122, 123, and 124. For example, each of the calculation units 121, 122, 123, and 124 can have three states such as a dormant state in which no action is taken, an idle state in which only a basic operation is performed, and a calculation state in which a load is received from a specific application program so that the corresponding calculation is performed. In addition, the calculation state can be further classified into a case in which high-speed calculation is required and a case in which low-speed calculation is required, as described above. For example, as to each of the calculation units 121, 122, 123, and 124, there are cases in which an amount of calculation that should be processed for a predetermined unit time, for example, 1 second is 1 Mbyte and 20 Mbyte. In this manner, the load factor of each of the calculation units 121, 122, 123, and 124 can be determined depending on an amount of calculation that should be processed per unit time. Thus, the device manager 220 can control each of the calculation units 121, 122, 123, and 124 so that the processing speed can vary depending on the load factor of each of the calculation units 121, 122, 123, and 124 provided from the scheduler 231. In addition, the device manager 220 according to the present disclosure can provide information about the load factor of each of the calculation units 121, 122, 123, and 124 to the service quality manager 210.

FIG. 3 is a control flowchart when driving a user-level application program in an electronic device according to an embodiment of the present disclosure.

The control flowchart of FIG. 3 is a control flowchart that is performed in the service quality manager 210, and can be substantial operations which are performed in the service quality prediction unit 211 and the service quality control unit 222.

Referring to FIG. 3, in operation 300, the service quality manager 210 can receive a calculation load and load factor information from a specific application program. In this instance, the application program that provides the calculation load together with the load factor information can be one of the user-level application programs with the load factor limit described above. In addition, when the load factor information is not provided from one of the user-level application programs with the load factor limit, the service quality manager 210 can control the load factor according to a limited load factor set in the electronic device itself.

In this instance, the limited load factor set in the electronic device itself can vary depending on the sleep state, the idle state, and the active state, as described above. Thus, when receiving the load factor information from at least one of the user-level application programs with the load factor limit, the service quality manager 210 can receive the above-described three pieces of information together.

The service quality manager 210 can receive these pieces of information in operation 300, acquire state information of the electronic device in operation 302, and receive current load information of the calculation processing unit 120 from the device manager 220. Here, the state information of the electronic device can be received from an OS, and determined based on the current load information of the calculation unit provided from the device manager 220. For example, when the current load of the calculation unit is 0% or less than 5%, the state information of the electronic device can be determined as the sleep state, when the current load thereof is 5% or more and less than 10%, the state information thereof can be determined as the idle state, and when the current load thereof is 10% or more, the state information thereof can be determined as the active state. The numerical values of 0%, 5%, and 10% can be merely provided as examples for convenience of description, and can be substantially different values.

Hereinafter, for convenience of description, description will be made assuming a case in which a load factor limit value is received from the user-level application program with the load factor limit. However, even a case in which the service quality manager 210 determines the load factor limit value depending on the state of the electronic device can be equally applied.

In operation 304, the service quality manager 210 can generate a calculation control parameter of the calculation unit according to the load factor received from the user-level application program with the load factor limit. The calculation control parameter can be a calculation parameter for enabling the load factor of the load of which calculation is to be performed in a specific calculation unit of the current calculation processing unit 120, to be a preset value or less. In operation 304, the service quality manager 210 can generate the calculation parameter, and then output the generated calculation parameter and a load to be calculated to the scheduler 231.

Next, the service quality manager 210 proceeds to operation 306, and waits for the reception of current load information of the calculation processing unit 120 from the device manger 220. When receiving the current load information of the calculation processing unit 120 from the device manager 220 based on the inspection result of operation 308, the service quality manager 210 can proceed to operation 310, and otherwise, it maintain operation 306.

When receiving the current load information from the device manager 220, the service quality manager 210 can proceed to operation 310, and inspect whether the calculation processing unit 120 is within a target load factor range. For example, when the current state of the electronic device is in the idle state and the load with the load factor limit is requested to be calculated by the load factor of 20% or less, the service quality manager 210 can inspect whether the load factor of the calculation processing unit 120 is present in 20% or less. Such a load factor can be set as the lowest load factor. For example, the highest load factor and the lowest load factor of the target load factor can be set together such that the target load factor is 10% or more and 20% or less.

When the load factor of the calculation processing unit 120 is within the target load factor range based on the inspection result of operation 310, the service quality manager 210 can proceed to operation 314, and otherwise, it can proceed to operation 312.

First, when the load factor of the calculation processing unit 120 is outside the target load factor range and the service quality manager 210 proceeds to operation 312, the service quality manager 210 can update the calculation parameter according to the received current state information and the target load factor. Next, the service quality manager 210 can output the updated calculation parameter to the schedule 231, and then proceed to operation 306.

Meanwhile, when the load factor of the calculation processing unit 120 is within the target load factor range based on the inspection result of operation 310, the service quality manager 210 can proceed to operation 314, and maintain the output calculation parameter. Next, the service quality manager 210 can proceed to operation 316, and inspect whether the calculation of the load is completed. When the calculation of the load with the load factor limit is completed, the service quality manager 210 can terminate the corresponding routine. However, when the calculation of the load with the load factor limit is not completed, the service quality manager 210 can proceed to operation 306, and wait for the reception of the current load information of the calculation processing unit 120 from the device manger 220.

Embodiments of the present disclosure disclosed in the specification and the drawings are only particular examples to easily describe the details of the present disclosure and assist in understanding of the present disclosure, and do not limit the scope of the present disclosure. Therefore, it should be construed that, in addition to the embodiments disclosed herein, all modifications and changes or modified and changed forms derived from the technical idea of the present disclosure fall within the scope of the present disclosure.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. An apparatus for executing software in an electronic device, the apparatus comprising:
    a memory configured to store a first user-level application program without a load factor limit, and a second user-level application program with a load factor limit; and
    a central processing unit (CPU) including a calculation processing unit, a device manager, a service quality manager, and a scheduler,
    wherein the CPU is configured to execute the first user-level application program, and the second user-level application program,
    wherein the calculation processing unit is configured to calculate a load received from at least one of the first user-level application program and the second user-level application program,
    wherein the device manager is configured to output a current load factor of the calculation processing unit,
    wherein the service quality manager is configured to:
        receive a load and a load factor limit from the second user-level application program, if the second user-level application program is executed,
        receive a current load factor of the calculation processing unit from the device manager,
        generate a calculation parameter to control the current load factor of the calculation processing unit lower than the load factor limit, and
        output the load and the generated calculation parameter, wherein the scheduler is configured to schedule the load of the second user-level application program to be processed in the calculation processing unit based on the calculation parameter, wherein the electronic device includes at least one of a sleep state, an idle state, and an active state of the electronic device, wherein the load factor limit has a different value based on a state of the electronic device, and wherein, when the load factor limit is not received from the second user-level application program, a service quality prediction unit is configured to set the load factor limit as a preset load factor limit based on a state of the electronic device.

2. The apparatus of claim 1, wherein the calculation processing unit is configured to include two or more calculation units.

3. The apparatus of claim 2, wherein the scheduler is further configured to provide, to the device manager, a total amount of a load to be calculated in each of the calculation units and throughput information requested per unit time.

4. The apparatus of claim 3, wherein the service quality manager includes:
the service quality prediction unit configured to receive the load and the load factor limit from the second user-level application program, and receive the current load factor from the device manager so that the current load factor of the calculation processing unit is within the load factor limit, and
a service quality control unit configured to output the load and the generated calculation parameter to the scheduler.

5. The apparatus of claim 2, further comprising:
a scheduler configured to distribute a load of which calculation is required to the two or more calculation units.

6. The apparatus of claim 1, further comprising:
one or more user-level application that is executed in the electronic device by a user's request.

7. The apparatus of claim 1, wherein, after outputting the load and the generated calculation parameter, the service quality manager is configured to detect a load factor fluctuation of the calculation processing unit from the device manager, and update and output the calculation parameter so that the current load factor is the load factor limit or less when the current load factor exceeds the load factor limit.

8. The apparatus of claim 1, wherein the load factor limit is a value set in advance in the electronic device.

9. A method for executing a user-level application program in an electronic device, the method comprising:
receiving a load factor limit and a load of the user-level application program, if the user-level application program is executed;
receiving a current load factor of a calculation processing unit;
setting the load factor limit as a preset load factor limit depending on a state of the electronic device, if the load factor limit is not received from the user-level application program;
generating a calculation parameter to control current load factor of the calculation processing unit lower than the load factor limit;
outputting the load of the user-level application program and the generated calculation parameter; and scheduling the load of the user-level application program to be processed in the calculation processing unit based on the calculation parameter, wherein the user-level application program includes a first user-level application program without a load factor limit and a second application program configured with a load factor limit, wherein, the electronic device includes at least one of a sleep state, an idle state, and an active state of the electronic device, wherein the load factor limit has a different value based on a state of the electronic device, and wherein the state of the electronic device is any one of a sleep state, an idle state, and an active state.

10. The method for executing the user-level application program of claim 9, further comprising:
receiving the current load factor of the calculation processing unit, after the outputting of the calculation parameter; and
updating the calculation parameter so that the current load factor of the calculation processing unit is within the load factor limit, when the received current load factor of the calculation processing unit exceeds the load factor limit.

11. The method for executing the user-level application program of claim 9, further comprising:
receiving the current load factor of the calculation processing unit, after the outputting of the calculation parameter; and
maintaining the calculation parameter, when the received current load factor of the calculation processing unit is within the load factor limit.

12. The method for executing the user-level application program of claim 9, further comprising:
providing a total amount of a load to be calculated in each of calculation units and throughput information requested per unit time, if the calculation processing unit includes two or more calculation units.

13. The method for executing the user-level application program of claim 12, further comprising:
receiving the load factor limit and the load from the user-level application program;
receiving the current load factor of each calculation processing unit from a device manager;
generating each calculation parameter of calculation unit so that the current load factor of the calculation processing unit is within the load factor limit; and
outputting the generated calculation parameter and the load.

14. The method for executing the user-level application program of claim 12, wherein, when the load factor limit is not received from the user-level application program, setting the load factor limit as a preset load factor based on a state of the electronic device.

15. The method for executing the user-level application program of claim 12, wherein, after outputting the load and the generated calculation parameter, detecting a load factor fluctuation of each calculation processing unit from a device manager, and updating and outputting the calculation parameter so that the current load factor is the load factor limit or less when the current load factor exceeds the load factor limit.

* * * * *